United States Patent [19]
Gillespie

[11] 3,961,231
[45] June 1, 1976

[54] CONTROLLED CHEMICAL INJECTION SYSTEM FOR WASHING MACHINES

[75] Inventor: Robert A. Gillespie, Bridgeport, Conn.

[73] Assignee: Stauffer Chemical Company, Westport, Conn.

[22] Filed: Apr. 17, 1975

[21] Appl. No.: 569,135

[52] U.S. Cl. .................................. 317/139; 222/70
[51] Int. Cl.² ............................................ G05D 7/00
[58] Field of Search ................ 317/137, 139, 141 R; 307/141; 222/70

[56] References Cited
UNITED STATES PATENTS

| | | | |
|---|---|---|---|
| 3,185,855 | 5/1965 | Kelly et al. | 317/139 X |
| 3,199,729 | 8/1965 | Samp | 317/137 X |

*Primary Examiner*—R. N. Envall, Jr.
*Attorney, Agent, or Firm*—Daniel S. Ortiz

[57] ABSTRACT

The invention is a controlled chemical injecting system for adding chemicals to two or more simultaneously operating washing machines. The apparatus comprises a reset electrical timer with associated control circuits for each chemical to be added to the washing machines. The reset timer is set for a predetermined time interval during which the chemicals are to be added to the washing machines. In connection with the reset timer, the control circuit for each washing machine has receiving means for receiving a signal from the programmer of each washing machine, signal holding means activated by the signal from each washing machine, a first signal blocking means which prevents the signal from the holding means from activating the reset timer if the reset timer is activated by another washing machine, a second signal blocking means which blocks the signal from other washing machines from reaching the reset timer when it has been activated by a first washing machine, directing means for directing the load output from the automatic reset timer to the chemical injecting means associated with the washing machine whose signal has activated the automatic reset timer. The circuit also contains a time delay means to permit the automatic reset timer to be reset before accepting a signal from a washing machine calling for the same chemical.

The apparatus provides means by which one timing device and metering device can introduce chemicals into two or more washing machines which are operating simultaneously. A separate reset timer and control circuit must be provided for each chemical which is to be introduced into the washing machines.

8 Claims, 2 Drawing Figures

— • — • —SIGNAL FROM WASHING MACHINE I
— — — — —SIGNAL FROM WASHING MACHINE 2
—⚡—⚡—⚡—SIGNAL FROM AUTOMATIC RESET ELECTRICAL TIMER.

CONTROLLED CHEMICAL INJECTION SYSTEM FOR WASHING MACHINES

BACKGROUND OF THE INVENTION

Commercial laundry operation usually requires simultaneous operation of two or more washing machines. Each washing machine requires addition of certain chemicals during a portion of its operating cycle. As many as eight chemicals may be added to a washing machine during a cycle. The addition of the chemicals at the proper time in the cycle, usually requires the attention of a washing machine operator. When two or more washing machines are operating simultaneously the addition of chemicals at the proper time in the cycle becomes difficult.

To ease the burden of the machine operator, automatic means for adding chemicals to a washing machine have been developed. A viable system should be able to service several simultaneously operating machines and provide metered quantities of chemicals to each washing machine at the proper time in the cycle. The system should be able to service several simultaneously operating washing machines without duplication of metering, pumping and storage means for each chemical.

The washing machine cycle is usually controlled by a washing machine programmer according to a program provided by the washing machine operator. The programmer may activate the cycle according to a program on punched cards, plastic tabs, adjustable cams, or by other means for setting the cycle of washing machines. Chemicals are introduced, to carry out different functions, during different portions of the washing machine cycle.

The washing machine programmer can be utilized to activate chemical addition means at various portions of the cycle. The timed portion of the programmed cycle is variable, and is usually longer than the time during which the required chemical is to be added. It is usually required to add the chemical to the washing machine as early in the portion of the cycle, as possible, unless the chemicals are premeasured and merely require dropping in to a specific machine on signal from the programmer. The washing machine programmer is usually not suitable for controlling the addition of chemicals to the washing machine.

U.S. Pat. No. 3,653,234 describes an apparatus for introducing reagents into a drycleaning apparatus. The apparatus described in the patent is suitable for introducing chemicals into a washing machine. The apparatus, however, is only suitable for adding the chemicals into a single operating washing machine. If the system disclosed in U.S. Pat. No. 3,653,234 were utilized to introduce chemicals into two or more simultaneously operating washing machines, the possibility exists that two or more washing machines could call for the same chemical at the same time. When this would happen, the apparatus disclosed in U.S. Pat. No. 3,653,234 would add indeterminate amounts of chemicals to each washing machine. The apparatus would not be suitable since it is necessary to add more or less precise amounts of chemicals to each washing machine.

It is the object of the present invention to provide an apparatus for automatically adding metered amounts of chemicals to washing machines. It is a further object of the present invention to provide an apparatus which can automatically add metered amounts of chemicals to two or more simultaneously operating washing machines.

BRIEF SUMMARY OF THE INVENTION

According to the present invention a chemical can be automatically introduced from a metering device through a chemical introducing means into two or more simultaneously operating programmed washing machine for a predetermined time interval by a control system which utilizes a reset timer and load contacts adapted to be connected to said metering device for each chemical in combination with a system for activating the reset timer associated with each washing machine. The system associated with each washing machine comprises means for receiving and relaying a signal from the programmer of the washing machines to the reset timer said receiving and relaying means comprising means for receiving and holding a signal from a washing machine programmer, a first signal blocking means activated by a signal from a first washing machine programmer which has activated the reset timer and into which chemical is being introduced, to prevent reactivation of the reset timer before the termination of the predetermined timed feed interval to the first washing machine which has activated the reset timer, signal time delay means which delays the signal from the signal holding means to permit the reset timer to reset after the timed interval, a second signal blocking means associated with the systems of all other washing machines which permits the signal from a first washing machine to activate the reset timer when the reset timer is not introducing a chemical into a washing machine and output load directing means which directs the output load of the load contacts of the reset timer to activate the chemical introducing means at the washing machine whose signal has activated the automatic reset timer.

The signal holding means is preferably a latching relay which is unlatched after completion of the timed interval.

The signal blocking means can be multicontact switch relays which are normally open for a first washing machine and normally closed for each other washing machine to be fed by the system. On activation by a first washing machine the contacts for the first washing machine is closed and the contacts for each other washing machine is opened thereby blocking the signal to the reset timer from other washing machines.

DETAILED DESCRIPTION OF THE INVENTION

Figure 1:
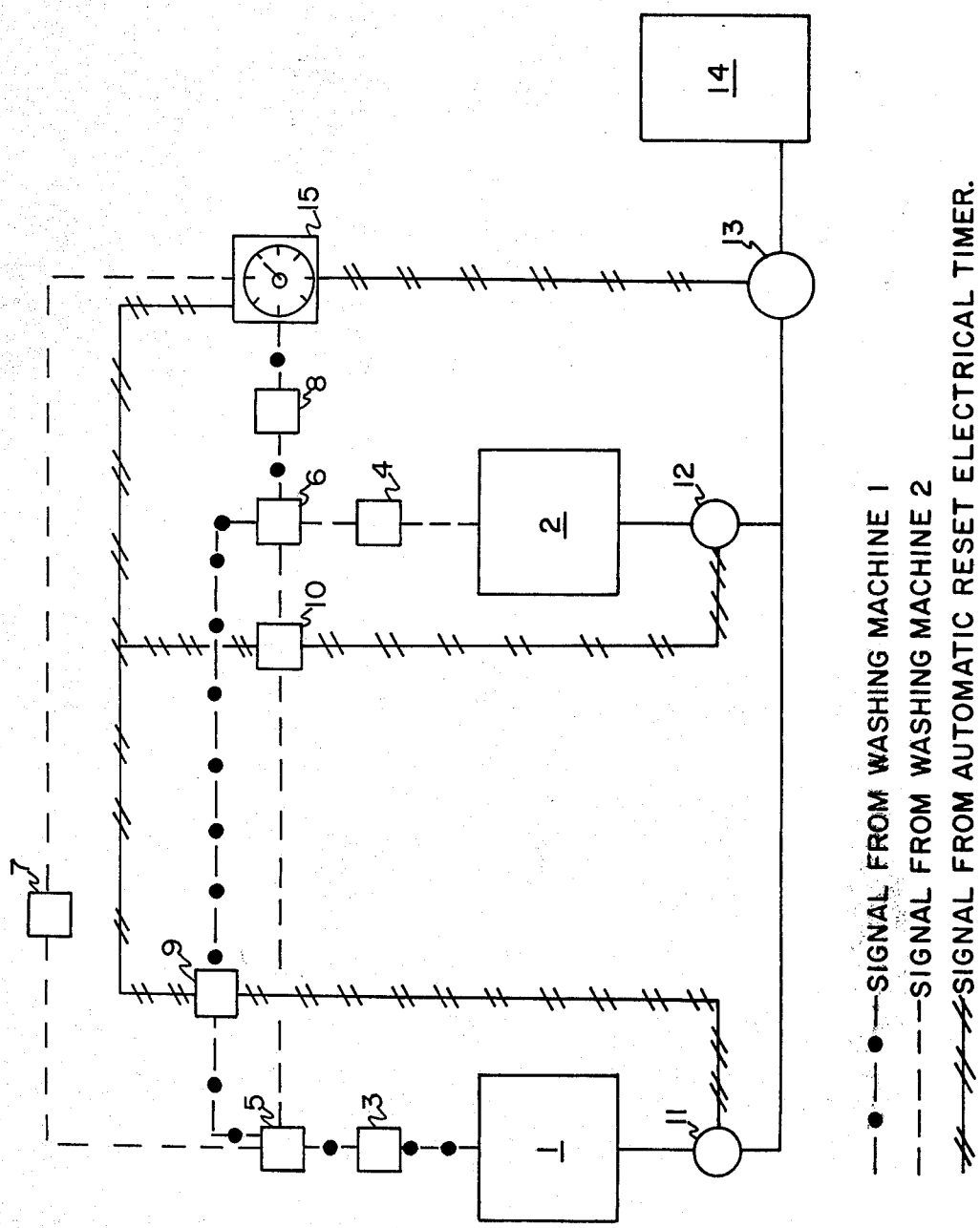
FIG. 1 is a block diagram of the control system of the invention.

The control system of the invention:
1. permits one reset timer to add a chemical to two or more simultaneously operating washing machines;
2. permits one chemical dispensing means to add a chemical for a preset time interval to two or more simultaneously operating washing machines;
3. permits addition of two or more chemicals simultaneously to one washing machine;
4. prevents addition of one chemical to more than one washing machine at one time;
5. requires that a separate system and reset timer be used for each chemical which is to be added to the washing machines. Each chemical can be added to the individual washing machines through a common line with automatically operated cutoff means at each washing machine activated by the reset timer.

The preferred embodiment of the invention utilizes a reset timer such as an Industrial Timer Corporation Series CSF Timer or a Series 305 Reset Timer produced by Automatic Timing Controls, Inc. However, other reset timing means such as time delay relays can be utilized in a properly adapted circuit. The apparatus will be illustrated by reference to a reset timer such as the Series CSF manufactured by Industrial Timer Corporation.

The system requires an interconnection with the programmer of each washing machine. The programmer selects the chemical to be added and the time at which it is to be added to the washing machine. The signal from the washing machine programmer does not have to be as long as the time interval over which the chemical is added to the washing machine, but can be shorter or longer. However, to minimize interference between operation of several washing machines the signal from the programmer should be shorter or no longer than the timed interval during which the chemical is to be added to a washing machine.

The signal from the programmer usually activates a relay which is utilized to correct any voltage differences between the control system and the washing machine programmer. Washing machine programmers usually operate at voltages of from 12 to 240 volts. A control system can be designed to operate at any of these voltages. However, it is preferred to design a system to operate at a single voltage and match the voltage of the washing machine programmer to that of the control system with a voltage matching or correcting means. The voltage matching or correcting means can be a relay whose coil is adapted to the voltage of the washing machine programmer and whose contacts are adapted to introduce a signal into the control system at the design voltage of the system.

The voltage correcting or matching means is useful in that one system can be adapted to washing machine programmers which operate at different operating voltages. The voltage correcting means is not critical however since a system can be designed to operate at any voltage used by a particular washing machine programmer.

The signal from the washing machine programmer is then passed to a signal holding means. The signal holding means retains the signal from the programmer until the signal from the washing machine has activated the automatic reset timer which in turn activates the chemical addition means such as pumps, feeders, valves and the like.

The signal holding means can conviently be a latching relay which is latched on receipt of a signal and unlatched after the signal has activated the automatic reset timer.

The signal which has passed through the signal holding means is passed to a first blocking means which blocks a signal from another washing machine during the timed interval a chemical is being added to the washing machine which has activated the automatic reset timer.

The signal then passes to a second blocking means which prevents the signal from the first washing machine from activating the automatic reset timer when a second washing machine has activated the automatic reset timer. The second blocking means does not have to follow the first blocking means but must be in the system.

The first and second signal blocking means are similar in operation and have the same effect in the system. When the first washing machine has activated the reset timer, the blocking means, activated by the signal, prevents signals from other washing machines from activating the reset timer On the other hand, the signal from the first washing machine must pass through the blocking means associated with each other washing machine associated with the reset timer. The signal from the first washing machine would be blocked by the blocking means associated with any other washing machine into which the same chemical was being introduced by the output of the reset timer.

The first and second blocking means can be the same blocking means associated with different washing machines. The first blocking means is activated by the signal from the first washing machine. The first blocking means prevents a signal from a second washing machine from activating the reset timer. The second blocking means is activated by a second washing machine programmer and prevents a signal from the first washing machine from activating the reset timer.

After the second blocking means the signal is passed to a signal time delay means which delays the signal to permit the automatic reset timer to reset. The time delay means is valuable in the system since the automatic reset timer usually requires a finite amount of time to reset after timing a predetermined time interval. If the signal time delay means is not in the system, the automatic reset timer can be activated, immediately after introducing a chemical into a washing for a predetermined time interval, by a signal from a washing machine programmer in the signal holding means associated with that washing machine. A reset timer which is activated before being fully reset does not provide a consistent predetermined timed interval.

The time delay means is also useful when there is a possibility that two or more washing machines will be awaiting addition of one chemical while the chemical is being added to a third washing machine. In this case, the time delay means associated with each washing machine can be set to delay the signal to the automatic reset timer by differing amounts, so that the reset timer cannot be activated by signals from two washing machines which arrive simultaneously.

After the time delay means, the signal from the washing machine programmer activates the automatic reset timer which operates valves, pumps or other means for adding the chemical to the washing machine which has activated the automatic reset timer.

The load output from the automatic reset timer must pass through output load directing means to ensure that the proper valves and feeders, associated with the washing machine which activated the reset timer, are operated to introduce the chemical into the proper washing machine.

After the timed interval which has been set on the reset timer is completed, the means by which the chemicals are added to the washing machine are deactivated and the system remains inoperative until activated by a signal from a washing machine programmer.

The reset timer can be activated by signals from programmers from two or more washing machines and activate means for adding a chemical to each of the washing machines, one at a time.

An individual system for activating the reset timer must be supplied for each washing machine programmer and for each chemical to be added to the washing machine. Only one reset timer and metering means for adding a chemical to a washing machine is required for each chemical to be added to the washing machines.

Since each chemical requires a separate system, two or more chemicals can be simultaneously added to one washing machine and different chemicals can be added to different washing machines without interference.

The control system of the present invention will be more fully illustrated by reference to FIG. 1.

FIG. 1 illustrates a block diagram of a system for adding one chemical to two simultaneously operating washing machines. The system can be applied to more than two washing machines but for the sake or clarity the system as applied to only two washing machines is illustrated.

FIG. 1 illustrates two simultaneously operating washing machines, 1 and 2 and a system for feeding a liquid chemical from tank 14 by metering pump 13 and control valves 11 and 12.

In operation, a signal from programmer of washing machine 1, which indicates that a chemical is required, proceeds to signal holding means 3 which receives and holds the signal until automatic reset timer 15 can be activated. If the automatic reset timer is not activated, the signal proceeds through signal holding means 3. Signal holding means 3 holds the signal in the case that washing machine 2 has activated the reset timer.

The signal from signal holding means 3 proceeds to blocking means 5 which is operated in conjunction with a signal from washing machine 2. Blocking means 5 prevents the signal from washing machine 1 from activating reset timer 15 if the reset timer has been activated by a signal from washing machine 2.

The signal from blocking means 5 passes to reset timer output load directing means 9. Automatic reset timer output load directing means 9 directs the output of the automatic reset timer to the chemical addition means which in this case is valve 11 associated with washing machine 1 which has activated the automatic reset timer. Reset timer load directing means 9 can be a relay which is operated by a signal from washing machine 1 which closes a switch in the output load circuit of the reset timer directing the output load to valve 11.

The signal from the automatic reset timer output load directing means 9 then passes to blocking means 6, which blocks the signal from programmer of washing machine 2 and holding means 4, in the event that the signal from washing machine 1 has activated the automatic reset timer 15.

The signal from washing machine 1 having passed through blocking means 6 passes to time delay means 8 which delays the signal from washing machine 1. Time delay means 8 permits reset timer 15 to reset after having provided a chemical to washing machine 2, for the timed interval, before activation by a signal from the programmer of washing machine 1.

If washing machine 2 requires chemical addition while the chemical is being added to washing machine 1, the signal from the programmer of washing machine 2 would pass to signal holding means 4 and would be prevented from passing through blocking means 6 by the action of the signal from washing machine 1 on blocking means 6.

The output load of the timer is directed to valve 11, which is activated to introduce the chemical to washing machine 1, by timer output load directing means 9. Timer output load directing means 10 would block the output load from reset timer 15 from reaching valve means 12 for adding the chemical to washing machine 2 while the chemical was being introduced into washing machine 1.

When the automatic reset timer has provided the chemical for the preset timed interval to washing machine 1 through valve means 11, the signal from the programmer of washing machine 1 in signal holding means 3 is cancelled.

When the signal to the automatic reset timer from washing machine 1 has been removed from the circuit, a signal from signal holding means 4 in the circuit of washing machine 2 which was blocked by blocking means 6 would then pass through blocking means 6 and reset timer output load directing means 10 and blocking means 5 associated with the circuit of washing machine 1.

Blocking means 5 in the circuit of washing machine 1 prevents a signal from washing machine 1 from activating reset timer 15 when reset timer 15 is providing the chemical from tank 14 through pump 13 and valve 12 to washing machine 2 for the timed interval.

The signal from washing machine 2 then passes through time delay means 7 which provides a delay in the signal from washing machine 2 to reset timer 15 to permit it to reset after having delivered the chemical to washing machine 1 for a timed period. The load output of reset timer 15 then proceeds through reset timer load output directing means 10 to valve 12 which introduces the chemical to washing machine 2.

If during the timed period, that the chemical is being introduced into washing machine 2 the programmer for washing machine 1 should indicate that the chemical in tank 14 was needed at this part of the program, the signal from the programmer of washing machine 1 would pass to holding means 3 but would be blocked from proceeding to reset timer 15 by signal blocking means 5 activated by the signal from washing machine 2 which has activated reset timer 15.

When reset timer 15 has provided the timed interval for injection of the chemical into washing machine 2, the signal is removed from signal holding means 4 and the circuit associated with washing machine 2 to automatic reset timer 15. The signal from signal holding means 3 associated with washing machine 1 could then proceed through blocking means 5, reset timer output load directing means 9, holding means 6 and time delay means 8 to activate the reset timer 15 for introduction of a chemical into washing machine 1, from tank 14, through pump 13 and valve means 11.

Figure 2:
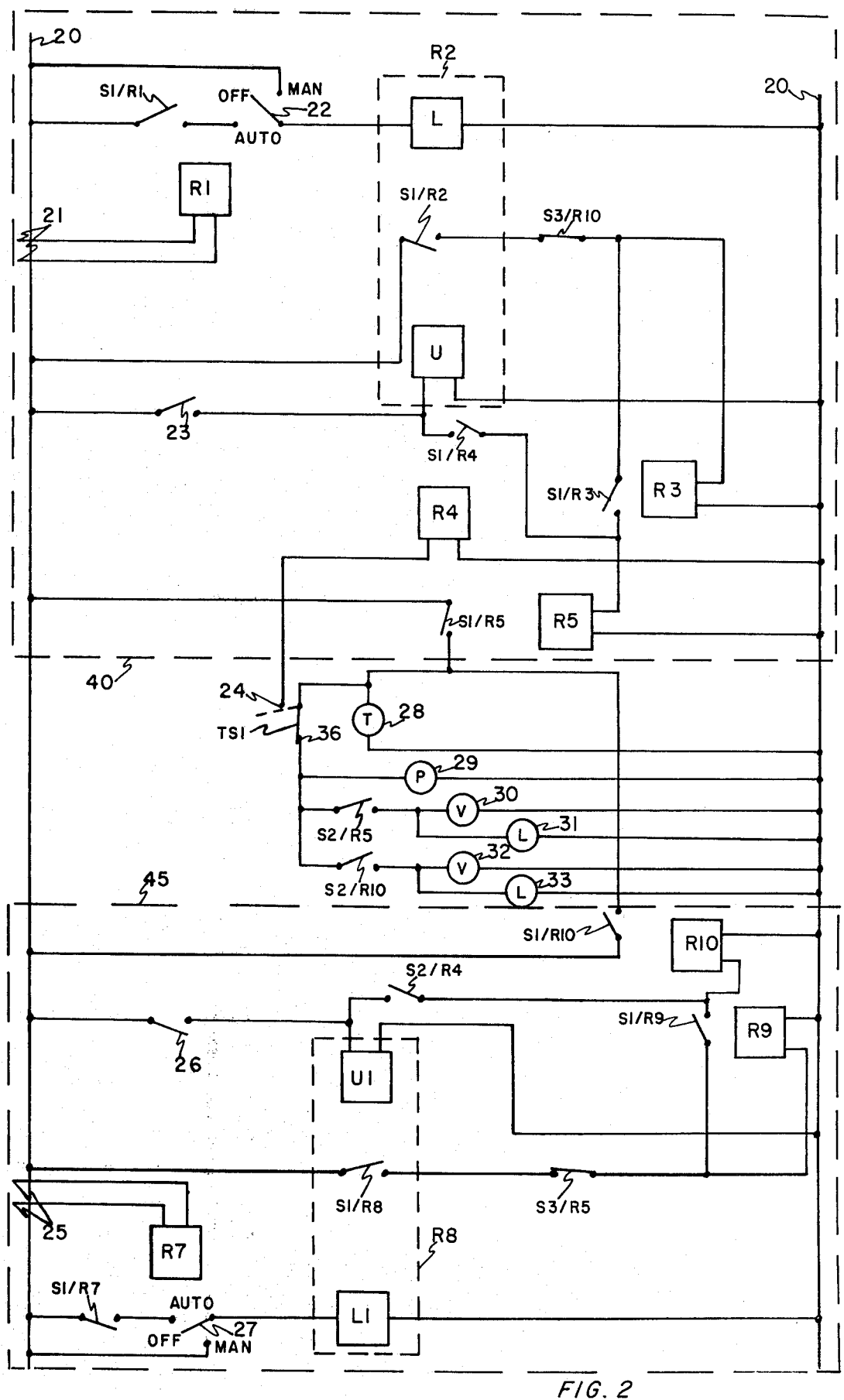
FIG. 2 is a schematic diagram of a preferred embodiment of the electric control system.

FIG. 2 is a diagrammatic illustration of electrical circuits which can be combined to provide the holding means, blocking means and output load directing means associated with the circuit of the block diagram of FIG. 1.

FIG. 2 is an electric circuit diagram which illustrates an electric circuit to control the introduction of one chemical into two washing machines. Additional washing machines in the line can be controlled by the reset timer 28, by additional control circuit associated with the reset timer 28. Coupling of additional washing machines to automatic reset timer 28 requires that additional control circuits such as control circuit 40 or 45 and valve means such as 30 and 32 to direct the chemical to the proper washing machine be used in conjunction with the automatic reset timer 28.

The circuit diagram of FIG. 2 illustrates the position of the switches and relays when the circuit is at rest and a chemical is not being introduced into a washing machine. Control circuits indicated as 40 and 45 are enclosed within the dashed line.

In the diagram, the relay contacts are noted by a contact number/relay number (S/R) to denote the relay with which they are associated.

Relay R2 and R8 are latching relays and the latching coils (L, L1) and unlatching coils (U and U1) with the associated contacts are shown within the dashed blocks.

Power enters the control system through power lines 20.

When the programmer for washing machine 1 emits a signal that the chemical controlled by pump 29 is required, an electrical signal from washing machine 1 enters the coil of relay R1, of control circuit 40, through lines 21. The coil of relay R1 is matched to the output signal of the washing machine programmer. The rest of the circuit can be standardized to operate on one voltage or one particular type of current. The use of relay R1 adds flexibility to the system in that the circuit can be adapted to accommodate many types of washing machine programmers merely by matching relay R1 to the programmer.

In operation, the control circuit for the washing machines is switched to the auto position by switch 22. Switch 22 has a manual position which will instantaneously activate the circuit for test purposes. The switch is designed so that when pressure is removed from the switch the switch moves from the manual to the off position. When the switch is placed in the auto position, the switch will remain in the auto position.

When a signal from washing machine 1 is received by relay R1, the contacts S1/R1 close and the electrical current is passed through switch 22 in the auto position to latching coil L of latching relay R2. The latching coil L of relay R2 latches contacts S1/R2 which permit electricity to flow from power lines 20 through contacts S3/R10 which are normally closed unless relay R10 in control circuit 45 is activated.

Contacts S3/R10 are a blocking means which prevents the electrical signal from passing through relays R3 and R5 if relay R10 has been activated in control circuit 45 associated with washing machine 2. The contacts S3/R10 are in the normally closed position as shown. If no conflict exists with addition of the chemical to washing machine 2, the current is permitted to pass through contacts S3/R10 and the coil of relay R3. Relay R3 is a time delay relay which closes contacts S1/R3 after a preset time interval after current has begun to flow through the relay. The time delay relay R3 is necessary to prevent activation of relay R5 and closing contacts S1/R5 before the automatic electrical reset timer 28 has been reset.

Automatic reset timers require a finite length of time to reset. If time delay relay R3 is not in the circuit, the automatic reset timer could be activated immediately after its timed cycle had been completed if a second washing machine programmer indicated that the chemical was required in the second washing machine. Immediate activation of the reset timer before it can reset would provide a timed interval shorter than the predetermined timed interval set on the reset timer.

After a short time delay contacts S1/R3 close and permit current to flow through the coil of relay R5. Relay R5 closes contacts S1/R5, S2/R5 and opens contacts S3/R5. Upon closing, contacts S1/R5 provide power to automatic reset timer 28 which immediately begins to time the predetermined time interval.

Electric current also flows through timer contacts TS1, which are in the normally closed position, and activates pumping means 29 and valve means 30 through contacts S2/R5. Said valve means 30 directs the flow of the chemical to washing machine 1 which activated control circuit 40. Relay contacts S2/R5 are the output load directing means associated with control circuit 40 which direct the output load from timer switch TS1 associated with timer 28 to the valve associated with washing machine 1.

Relay contacts S3/R5 are the blocking means which prevent a signal from the programmer of washing machine 2 from activating the reset timer 28 when it has been activated by washing machine 1. Relay contacts S3/R5 are the equivalent of blocking means 6 associated with washing machine 2 in FIG. 1.

At the end of the predetermined time interval timer contacts TS1 are opened, breaking contact with contact 36 and closing with contact 24 as shown by the dotted line. The switch TS1 is in contact with contacts 24 during the time reset timer 28 is resetting. Closing with contacts 24 permits electric current to flow through the coil of relay R4 closing contacts S1/R4 which permits current to flow through coil U which unlatches the contacts S1/R2 of latching relay R2. When contacts S1/R2 of latching relay R2 are opened the circuit is deactivated.

The control circuit 40 contains latching relay R2 which holds the signal from washing maching 1 in the event that relay R10 in control circuit 45 has activated reset timer 28. Contacts S3/R10 are open when relay R10 is activated.

When the electric timer has reset, electric timer switch TS1 goes to the normally closed position in contact with contact 36. The timer however, is inactivated because contacts S1/R5 of relay R5 and contact S1/R10 of relay R10 are both normally open and the electric timer circuit does not have a power source.

Control circuit 45 associated with washing machine 2 operates in a manner similar to control circuit 40 associated with washing machine 1.

Control circuit 45 associated with washing machine 2 is activated when switch 27 is placed in the auto position. Placing switch 27 in the auto position permits a signal from washing machine 2 which has provided power to the coil of relay R7 through lines 25 to close normally open contacts S1/R7 and provide power to the latching coil L1 of latching relay R8 (within dashed lines). The control circuit can also be activated by placing switch 27 in the manual position which provides power to the latching coil L1 of latching relay R8. It is preferred to have switch 27 set up in such a manner that when placed in the manual position, the switch automatically returns to the off position when the pressure applied to switch 27 has been removed. The switch when placed in the auto position will remain in the auto position until manually set to the off position.

The signal from the programmer of washing machine 2 passes through lines 25 to coil of relay R7. Coil of relay R7 closes contacts S1/R7 and provides power form line 20 through switch 27 to latching coil L1 of latching relay R8, the holding means 4 in the circuit shown in FIG. 1. Latching coil L1 of relay R8 closes normally open contacts S1/R8 which provide power to relays R9 and R10 if switch S3/R5 is closed. Switch S3/R5 is normally closed but is open when relay R5 is activated by a signal from the programmer of washing machine 1. If contacts S3/R5 are open, contacts S1/R8 of latching relay R8 remain closed or in the latched position until the relay is unlatched by current passing through the unlatching coil U1 of relay R8.

When contacts S3/R5 are closed, the current is passed to the coil of relay R9 which is a time delay relay, which after a short time delay, closes contacts S1/R9 and provides current to coil of relay R10. Relay R10 closes normally open contacts S1/R10, S2/R10, and opens normally closed contacts S3/R10.

Contacts S3/R10, when open, prevent a signal from washing machine 1 from activating automatic reset timer 28 and maintains the latching relay R2 in the latched position if a signal from washing machine 1 has latched the contacts S1/R2 in latching relay R2. Latching relay R2 cannot be unlatched until contacts S3/R10 and S1/R3 are closed permitting power to pass through contacts S1/R4 of relay R4. Only after the predetermined timed interval set on the automatic reset timer has expired is electrical current supplied to unlatching coil U of relay R2 and the system deactivated. By use of the latching relays R2 and R8 which hold the signal from the washing machine programmer, the chemicals can be serially introduced into the washing machines.

The current passes through R9, a time delay relay which delays closing of contacts S1/R9 for a sufficient length of time to permit automatic electric reset timer 28 to reset. The time delay relay R9 is necessary to prevent activation of automatic electric reset timer 28 should the signal from the programmer of washing machine 2 activate control circuit 45 while automatic reset timer 28 is providing the same chemical to washing machine 1. When contacts S1/R9 close, power is applied to relay R10 which closes contacts S1/R10, S2/R10 and opens contacts S3/R10.

Contacts S1/R10 provide power to automatic electric reset timer 28, pump 29 and valve 32 and light 33 through contacts S2/R10.

After the predetermined time which has been set on reset timer 28, automatic reset timer switch TS1 moves from contact 36 to contact 24. When the automatic reset timer switch TS1 moves from contact point 36, power is removed from pump 29 valve 32 and light 33. Power is applied to relay R4 which closes contacts S2/R4 in circuit of the unlatching coil U1 of relay R8 which opens contacts S1/R8. When contacts S1/R8 are opened, the power to time delay relay R9 and relay R10 is removed and contacts S1/R9 and S1/R10 are opened removing the power from the automatic reset timer 28.

Contacts S3/R5 and S3/R10 are blocking means in the circuit which are normally closed but are opened when a signal from another circuit has activated automatic reset timer 28.

When additional washing machines are in the system, the blocking contacts, associated with each washing machine must be in all the circuits associated with the washing machines for controlling a particular chemical. This can be accomplished by having a multiple contact switch associated with the blocking relays which are normally closed with the exception of the contacts for the particular circuit being activated. Upon activation the multiple contact switch opens the circuits to all the other washing machines in the sytem and closes the contacts for the washing machine in which circuit the relay is installed.

As can be seen by the above description of the circuits in FIG. 2, the automatic electric reset timer 28 can be operated by only one washing machine at one time to provide a particular chemical to the washing machine which has activated the automatic reset timer. Each chemical which must be added to a washing machine must have its individual control circuit. Since each chemical requires a separate circuit, two or more chemicals can be added to a washing machine at the same time and different chemicals can be added to different washing machines at the same time without interference.

The invention has been described with reference to an electromechanical reset timer. However, the invention can be operated by use of other timing devices with appropriate circuit modification without departing from the spirit of the invention.

What is claimed is:

1. A system for automatically introducing a chemical, from a metering device, through a chemical introducing means into two or more simultaneously operating programed washing machines, for a predetermined time interval which comprises: an electrical circuit which includes an automatically resettable timing means, settable for the predetermined time interval, means for activating the chemical introducing means in response to the timed interval and means for receiving and relaying a signal from the programmers of the washing machines to the automatically resettable timing means, said receiving and relaying means associated with each washing machine comprising in combination; means for receiving and holding a signal from a washing machine programmer; a first signal blocking means, activated by a signal from a first washing machine programmer which has activated the timing means, to prevent reactivation of the timing means, by a signal from a second washing machine programmer, before termination of the predetermined time interval; signal time delay means which delays the signal from the signal holding means to permit the timing means to reset after the predetermined time interval; a second signal blocking means, associated with the circuits of all other simultaneously operating washing machines in the system, which passes the signal from the programmer of a first washing machine programmer, when the timing means is not activated by a signal from a second washing machine programmer; and means for directing the chemical introducing activating means, to the chemical introducing means associated with the washing machine whose programmer activated the timing means.

2. The system of claim 1 wherein the automatically resettable timing means comprises a reset timer.

3. The system of claim 1 wherein the signal holding means comprises a latching relay.

4. The system of claim 1 wherein the first and second signal blocking means comprise multiple contact relays.

5. The system of claim 1 wherein the means for directing the chemical introducing activating means comprises a multiple contact relay.

6. The system of claim 1 wherein the automatically resettable timing means is a reset timer and the signal holding means is a latching relay.

7. The system of claim 1 wherein the automatically resettable timing means is a reset timer, the signal holding means is a latching relay and at least one signal blocking means is a multiple contact relay.

8. The system of claim 1 wherein the automatically resettable timing means is a time delay relay.

* * * * *